US012678370B2

(12) United States Patent
Gäbele

(10) Patent No.: US 12,678,370 B2
(45) Date of Patent: Jul. 14, 2026

(54) INFUSION BOWL FOR A SAUNA HEATER

(71) Applicant: Klafs GmbH, Schwäbisch Hall (DE)

(72) Inventor: Markus Gäbele, Schwäbisch Hall (DE)

(73) Assignee: Klafs GmbH, Schwäbisch Hall (DE)

( * ) Notice: Subject to any disclaimer, the term of this patent is extended or adjusted under 35 U.S.C. 154(b) by 113 days.

(21) Appl. No.: 18/743,243

(22) Filed: Jun. 14, 2024

(65) Prior Publication Data

US 2024/0415733 A1 Dec. 19, 2024

(30) Foreign Application Priority Data

Jun. 16, 2023 (EP) .................................... 23179748

(51) Int. Cl.
*A61H 33/06* (2006.01)

(52) U.S. Cl.
CPC ..... *A61H 33/063* (2013.01); *A61H 2033/061* (2013.01); *A61H 2201/0207* (2013.01); *A61H 2201/105* (2013.01)

(58) Field of Classification Search
CPC ............ A61H 33/063; A61H 2033/061; A61H 2201/0207; A61H 2201/105; A61H 33/067; A61H 33/065
USPC ........... 4/524, 535; 607/1, 81, 83; 126/350.2
See application file for complete search history.

(56) References Cited

U.S. PATENT DOCUMENTS 5,771,503 A * 6/1998 Valimaa ............... A61H 33/063
392/394
6,695,800 B1 * 2/2004 Gary ...................... A61H 35/00
132/74.5

FOREIGN PATENT DOCUMENTS

| | | | | | |
|---|---|---|---|---|---|
| CZ | 7962 | U1 | * | 12/1998 | A61H 33/06 |
| DE | 3605577 | A1 | * | 8/1987 | A61H 33/06 |
| DE | 20304905 | U1 | | 7/2003 | |
| DE | 202006007622 | U1 | * | 11/2006 | A61L 9/03 |
| DE | 202005019488 | U1 | * | 4/2007 | A61H 33/063 |
| DE | 202013005379 | U1 | * | 6/2013 | A61H 33/063 |
| DE | 102012019875 | A1 | * | 4/2014 | A61H 33/063 |
| DE | 102018122503 | A1 | * | 3/2020 | A61H 1/00 |
| DE | 102019007860 | A1 | * | 5/2021 | F24H 3/02 |
| DE | 102021001904 | A1 | * | 10/2022 | A61H 33/067 |
| DE | 102023001769 | A1 | * | 11/2024 | A61H 33/063 |
| DE | 102023004128 | A1 | * | 4/2025 | F24H 7/002 |
| EP | 0678291 | A2 | * | 10/1995 | A61H 33/063 |
| EP | 3628302 | A1 | * | 4/2020 | A61H 33/065 |
| FI | 20010067 | A | | 7/2002 | |
| FR | 2952812 | A1 | * | 5/2011 | A61H 33/00 |
| JP | 3222639 | U | * | 8/2019 | A61H 33/06 |
| JP | 7478703 | B2 | * | 5/2024 | A61H 33/06 |
| JP | 3253143 | U | * | 10/2025 | A61H 33/06 |
| KR | 102522854 | B1 | * | 4/2023 | A61H 39/002 |
| SU | 957904 | A1 | | 9/1982 | |
| WO | WO-2018007671 | A1 | * | 1/2018 | A61H 33/065 |
| WO | WO-2022268649 | A1 | * | 12/2022 | A61H 33/066 |
| WO | WO-2025215295 | A1 | * | 10/2025 | A61H 33/06 |

* cited by examiner

*Primary Examiner* — Lori L Baker

(74) *Attorney, Agent, or Firm* — Husch Blackwell LLP

(57) ABSTRACT

The infusion bowl is adapted for use in a private sauna heater and includes a bowl body that is open at the top with outlet openings arranged in the bowl body. The infusion bowl includes a splash guard with a filling opening that is arranged on the bowl body. This arrangement allows even an untrained user to safely apply an infusion liquid into the infusion bowl.

18 Claims, 7 Drawing Sheets

INFUSION BOWL FOR A SAUNA HEATER

CROSS-REFERENCE TO RELATED APPLICATION

This application claims priority to and the benefit of European Patent Application No. 23179748.1, filed on Jun. 16, 2023, and entitled "INFUSION BOWL FOR A SAUNA HEATER," the entire contents of which is herein incorporated by reference.

BACKGROUND

1. Field

The present disclosure is related generally to an infusion bowl for a sauna heater, in particular for a private sauna. In addition, the disclosure is geared toward a sauna heater with the infusion bowl as well as toward an infusion device, in particular for a private sauna. The infusion bowl, the sauna heater, and the infusion device can also be used in a commercial sauna.

2. Related Art

EP 1 841 395 B1 shows a fully automated device for carrying out infusion and/or humidification processes in sauna cabins. The device comprises a carrier element on which a plurality of scooping elements is arranged, which scoop infusion liquid from a container and dispense it into an infusion bowl. The infusion bowl is arranged on a sauna heater and comprises recesses in its base. The infusion liquid supplied is dispensed through the recesses onto a stone fill of the sauna heater and evaporates there. The application of the infusion liquid into the infusion bowl is therefore automated. In addition, the device is configured in such a way that it can be operated without an operator having to enter the sauna cabin. The device is therefore preferably used in commercial sauna operations.

SUMMARY OF THE INVENTION

The object of the present disclosure is therefore to provide a device that is particularly suitable for use in a private sauna and enables safe use by an untrained user. In particular, the safe application of the infusion liquid into the infusion bowl is to be made possible.

The object is satisfied by the device including a splash guard with a filling opening is arranged on the bowl body.

The solution according to the disclosure allows even an untrained user to introduce the infusion liquid into the infusion bowl without splashing. This means that the full amount of liquid is available for the infusion, and splashing the infusion liquid, in particular onto users present in the sauna cabin, can be prevented.

In a preferred embodiment, the splash guard can be mounted on the bowl body. This means that the splash guard can be easily mounted onto the bowl body and also easily removed again. The infusion bowl can be easily cleaned. The infusion bowl is preferably circular in top view. The splash guard is preferably configured as a circular disk with a central filling opening. The filling opening is preferably likewise formed to be circular. However, any other shape of the filling opening in the splash guard is also possible. For example, the filling opening could also be rectangular or square.

It can be provided in a further preferred embodiment that the splash guard has downwardly projecting tabs that interact with the bowl body. The splash guard can be latched onto the bowl body using the tabs. The tabs preferably engage on the inside of the bowl body. However, it can also be provided that the tabs engage on the outside of the bowl body.

It can be provided in yet another preferred embodiment that the splash guard on its outer circumference is flush with the bowl body. The infusion bowl therefore has a smooth outer surface. This makes the infusion bowl easy to clean. Easy handling is also enabled. Since there are no protruding elements provided on the infusion bowl, the risk of injury when handling the infusion bowl is also minimized.

The splash guard can preferably be inclined inwardly in the direction toward the filling opening into the interior of the infusion bowl. This configuration can ensure that the infusion liquid does not splash out into the sauna cabin when it is filled into the infusion bowl. Infusion liquid impinging the splash guard flows downwardly on the inwardly inclined surface of the splash guard and therefore also into the interior of the infusion bowl.

It can be provided in a particularly preferred embodiment that the bowl body comprises a projection that tapers upwardly and extends into the bowl interior. The projection that tapers upwardly is preferably arranged centrally in the bowl body. The projection is preferably formed to be conical. The outer surface of the conical projection can be formed to be straight or curved inwardly or outwardly so that the outer surface is hyperbolic or parabolic in section. The conical projection itself is preferably formed to be symmetrical. The interior space of the bowl body is then formed to be substantially toroidal. This achieves a uniform distribution of the infusion liquid in the infusion bowl. This leads to a uniform distribution of the infusion liquid onto the sauna heater. This also achieves uniform infusion with high infusion quality in a private sauna. The conical projection can be provided with a tip. However, it can also be provided that the tip of the conical projection is rounded.

It can be provided in yet another preferred embodiment that the upwardly tapered projection of the bowl body and the filling opening of the splash guard are aligned concentrically with each other. The infusion liquid introduced into the filling opening therefore impinges the center of the upwardly tapered projection. This leads to a very uniform distribution of the infusion liquid over the entire infusion bowl and therefore to high infusion quality.

The outlet openings in the bowl body are preferably arranged concentrically around the upwardly tapered projection. In particular, it can be provided that the outlet openings are arranged on circular lines that run concentrically with the upwardly tapered projection. The outlet openings are preferably arranged on at least three circular lines that run concentrically with the upwardly tapered projection, but five or more circular lines can also be provided. Starting from the center or a central axis of the upwardly tapered projection, the outlet openings are preferably arranged in a radiant manner. This enables uniform distribution of the infusion liquid onto the sauna heater.

It can be provided in yet another preferred embodiment that the outlet openings have different diameters. This enables the selective distribution of the infusion liquid onto the sauna heater.

It can also be provided that the spacing between two adjacent outlet openings is larger than the diameter of the outlet openings. This also enables the selective distribution of the infusion liquid onto the sauna heater, both locally as well as temporally.

Yet another embodiment can provide that the infusion bowl has an attachment device for attaching the infusion bowl to the sauna heater. The infusion bowl can thereby be firmly connected to the sauna heater. The infusion bowl is prevented from moving or even dropping down onto or off the sauna heater, and the safety of the device is increased.

The attachment device preferably comprises at least three legs, preferably four legs, for the attachment to a frame, preferably a cast frame, of the sauna heater. In particular, at least one of the legs, preferably several legs, can be screwed to the frame. This achieves the desired secure attachment of the infusion bowl to the sauna heater. However, it is also possible for the attachment device to be attached to other parts of the sauna heater.

In addition, the present disclosure relates to a sauna heater, in particular for a private sauna, comprising an infusion bowl as described above. As already described above, this solution according to the disclosure allows even an untrained user to introduce the infusion liquid into the infusion bowl that is arranged on the sauna heater so that the full amount of liquid is available for the infusion. Any splashing of the infusion liquid, in particular onto users present in the sauna cabin, can be prevented. The sauna heater can also be used in a commercial sauna.

The sauna heater preferably comprises a stone fill surrounded by a frame, preferably a cast frame, where the infusion bowl is attached to the frame. This enables the infusion bowl to be attached to the sauna heater in a simple and secure manner, prevents the infusion bowl from moving or even dropping off the sauna heater, and increases the safety of the device.

Furthermore, the present disclosure also relates to an infusion device for a sauna cabin, in particular for a private sauna, comprising a sauna heater as described above and a feed device arranged above the infusion bowl for feeding infusion liquid into the infusion bowl. This configuration makes it possible to automate the procedure of an infusion. The feed device is preferably activated by the user when an infusion is desired. Since the infusion liquid is not fed in by a human user, the likelihood of infusion liquid being splashed when introducing it into the infusion bowl is further reduced. The infusion device can also be used in a commercial sauna.

In particular, it can be provided that the feed device comprises a pipe arranged centrally above the infusion bowl by way of which the infusion liquid is dispensed into the infusion bowl. The pipe is preferably aligned concentrically with the upwardly tapering projection in the infusion bowl.

BRIEF DESCRIPTION OF THE DRAWINGS

These and other features and advantages of the disclosure will become more readily appreciated when considered in connection with the following description of the presently preferred embodiments, appended claims and accompanying drawings, in which:

DESCRIPTION OF THE ENABLING EMBODIMENT

Figure 1:
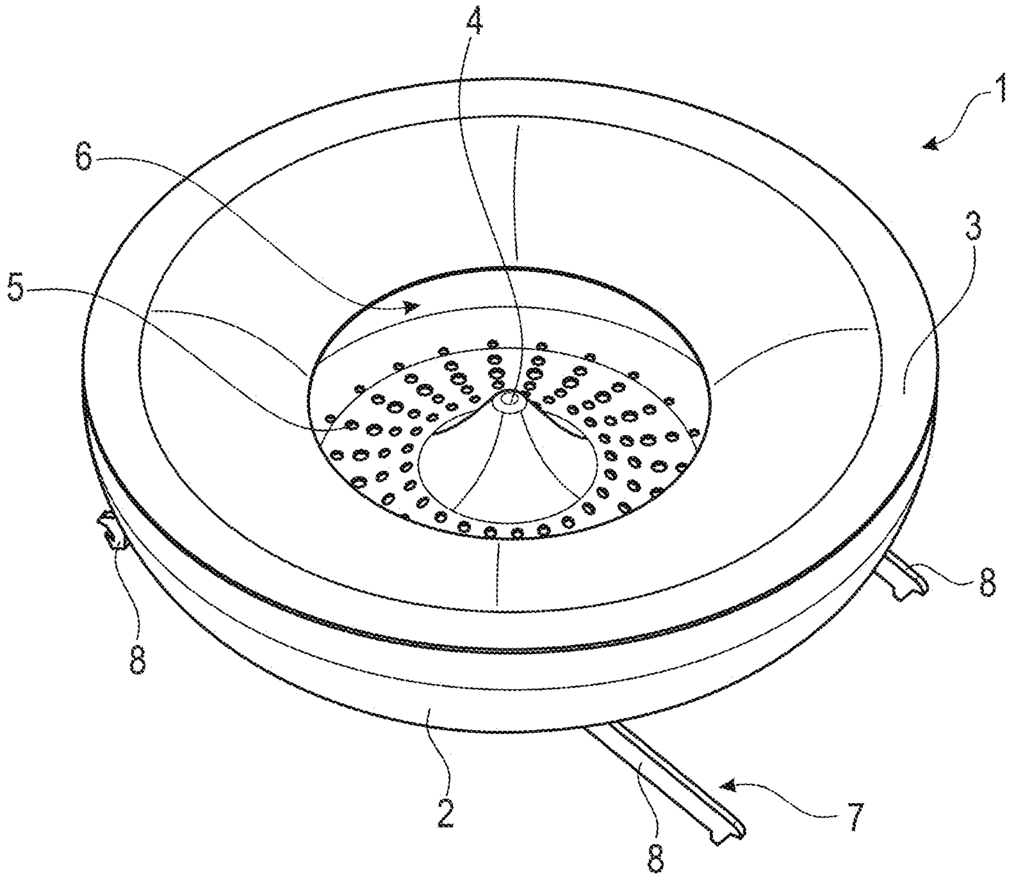
FIG. 1: shows a perspective view of an infusion bowl according to the disclosure from above.

FIG. 1 shows an infusion bowl 1 for a sauna heater. Infusion bowl 1 is intended in particular for use in a private sauna. However, it can also be used in commercial sauna operations. Infusion bowl 1 comprises a bowl body 2 and a splash guard 3 attached to bowl body 2. In the embodiment shown, bowl body 2 and splash guard 3 are two separate parts. The infusion bowl with the bowl body and the splash guard can also be formed integrally. Bowl body 2 is circular in top view. Bowl body 2 comprises a projection 4 that projects into the interior of bowl body 2 and tapers upwardly. In the embodiment shown, projection 4 is formed to be conical or tapered, respectively. Conical projection 4 is arranged centrally in bowl body 2. In addition, conical projection 4 is formed to be symmetrical. Outlet openings 5 are formed in bowl body 2. Outlet openings 5 are circular. Bowl body 2 is open on its upper side, i.e. on the side facing away from outlet openings 5. Splash guard 3 is attached to this side of bowl body 2. Splash guard 3 comprises a filling opening 6. Filling opening 6 is formed to be circular and arranged centrally in the splash guard. Splash guard 3 in top view therefore has the shape of a circular ring. Filling opening 6 and conical projection 4 in bowl body 2 are arranged concentrically to one another. Splash guard 3 ensures that the infusion liquid is not splashed into sauna cabin 1 when it is filled into infusion bowl 1.

Outlet openings 5 are arranged on circular lines that run concentrically around the center or the central axis of conical projection 4. Five such circular lines are provided in FIG. 1. Outlet openings 5 each located on a circular line are evenly spaced from one another. The spacing between adjacent outlet openings 5 is larger than the diameter of outlet openings 5. All outlet openings 5 located on the same circular line have the same diameter. Outlet openings 5 located on the central circular line have the largest diameter, and the diameter of outlet openings 5 decreases towards the outside and the inside. Therefore, outlet openings 5 located on the outermost and innermost circular lines have a smaller diameter than other outlet openings 5. Starting out from the center or the central axis of conical projection 4, outlet openings 5 are arranged on radiant lines. Therefore, the spacing between outlet openings 5 located adjacent to one another on the circular lines increases from the inside to the outside.

An attachment device 7 for the attachment of infusion bowl 2 to a sauna heater is fastened to the outside of bowl body 2. Attachment device 7 comprises four legs 8.

Figure 2:
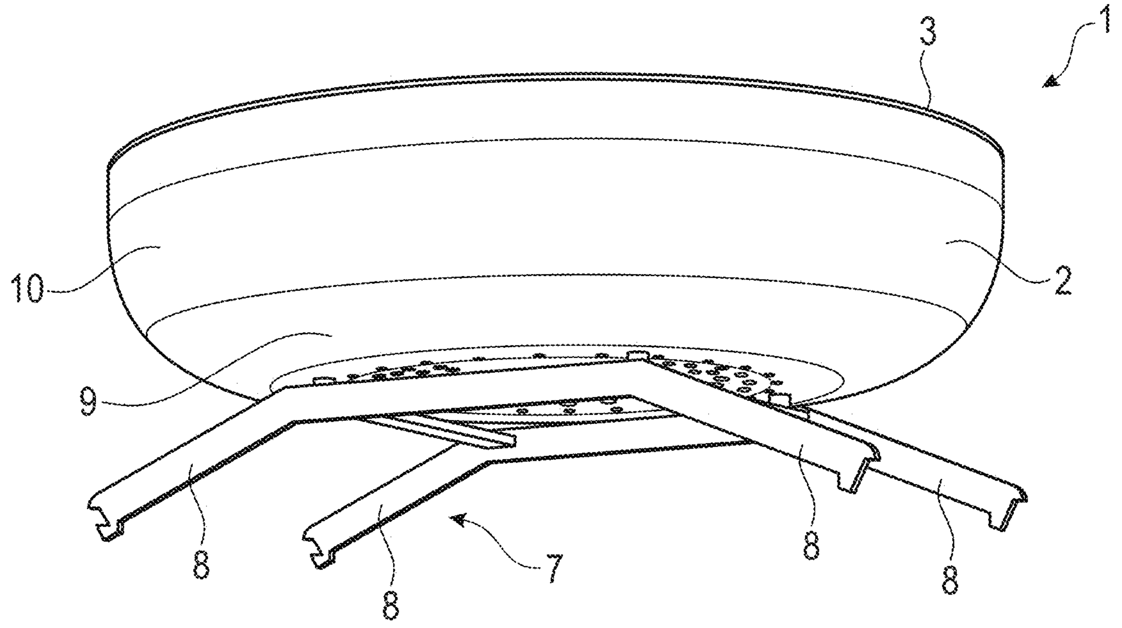
FIG. 2: shows a perspective view of the infusion bowl from FIG. 1 from below.

FIG. 2 shows a perspective view of infusion bowl 1 from FIG. 1 from below. Bowl body 2 comprises a substantially flat or horizontally extending base 9, in the center of which conical projection 4 protrudes inwardly into the interior of bowl body 2. Conical projection 4 is formed integrally with bowl body 2. Base 9 of bowl body 2 transitions with a curve to a substantially vertically extending side wall 10 of the bowl body. Bowl body 2 is open at the top. Splash guard 3 is arranged there. Splash guard 3 on its circumference is flush with the outer side of bowl body 2.

Attachment device 7 is attached to base 9 of the bowl body. Attachment device 7 can be screwed to bowl body 2 or can also be connected in a positive substance-fit manner. Attachment device 7 is configured as a bridge construction and comprises four legs 8, where two legs are always connected to one another by way of a bracket construction. Each one of legs 8 of a bracket construction can be hooked into a corresponding component of a sauna heater, the respective other leg 8 of a bracket is screwed to the sauna heater.

Figure 3:
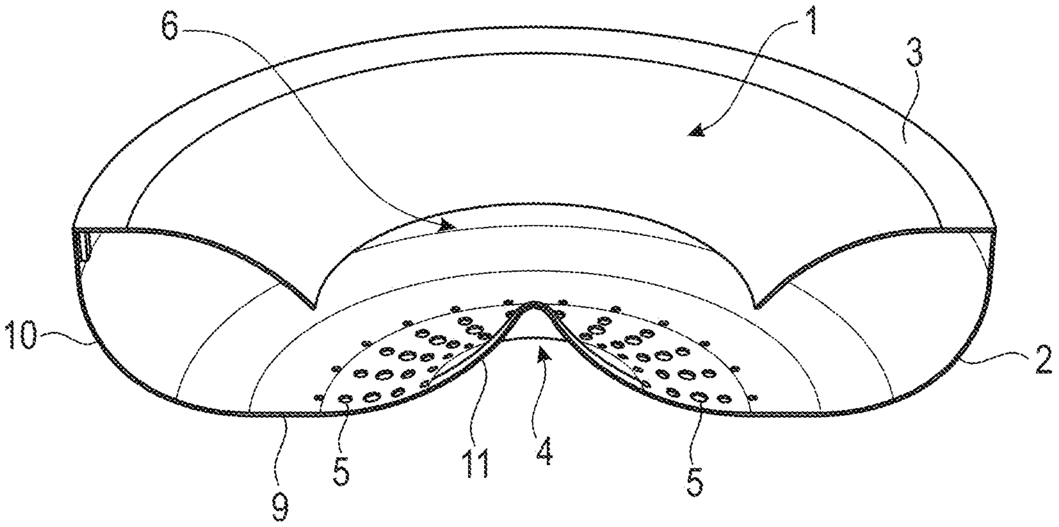
FIG. 3: shows a section through the infusion bowl from FIG. 1 in the vertical direction.

FIG. 3 shows a section through infusion bowl 1 from FIG. 1 in the vertical direction. Bowl body 2 comprises substantially horizontally extending base 9. At the center, base 9 forms conical projection 4 projecting into the interior of bowl body 2. It can be clearly seen in FIG. 3 that projection 4 is formed integrally with bowl body 2. The side wall or outer surface 11, respectively, of conical projection 4 is curved outwardly. In the section, the outer surface of projection 4 therefore has the shape of a hyperbola. The tip of conical projection 4 is rounded. Outlet openings 5 are formed at least in part in outer surface 11 of conical projection 4. The liquid filled into infusion bowl 1 flows down on outer surface 11 of conical projection 4 and is guided to outlet openings 5. There, the liquid exits infusion bowl 2 and drips onto a sauna heater where it evaporates and the desired infusion is created.

Splash guard 3 is attached at the top of bowl body 2. At its outer edge, splash guard 3 is flush with the outer side of bowl body 2. Starting out from its outer edge, splash guard 3 initially extends substantially horizontally and then curves in the direction towards filling opening 6 into the interior of bowl body 2. This prevents the infusion liquid from splashing outwardly when it is filled into infusion bowl 1. On the other hand, the surface of splash guard 3, which is curved inwardly in the direction toward inlet opening 6, leads to infusion liquid that impinges splash guard 3 also flowing into the interior of infusion bowl 1.

Figure 4:
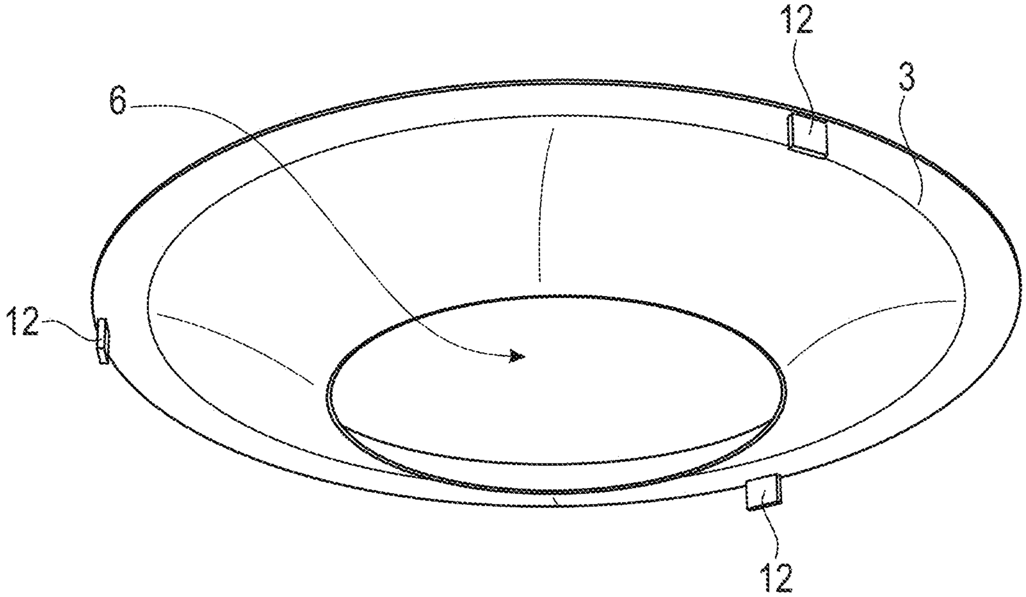
FIG. 4: shows a perspective view of a splash guard of the infusion bowl from FIG. 1 from below.

FIG. 4 shows a perspective view of splash guard 3 of infusion bowl 1 from FIG. 1 from below. The splash guard comprises three downwardly projecting tabs 12 on its outer circumference. The distance of tabs 12 to the edge of splash guard 3 corresponds approximately to the wall thickness of side wall 10 of bowl body 2. Tabs 12 interact with side wall 10 of bowl body 2, or abut against the inner side of bowl body 2, respectively, and hold splash guard 3 at bowl body 2.

Figure 5:
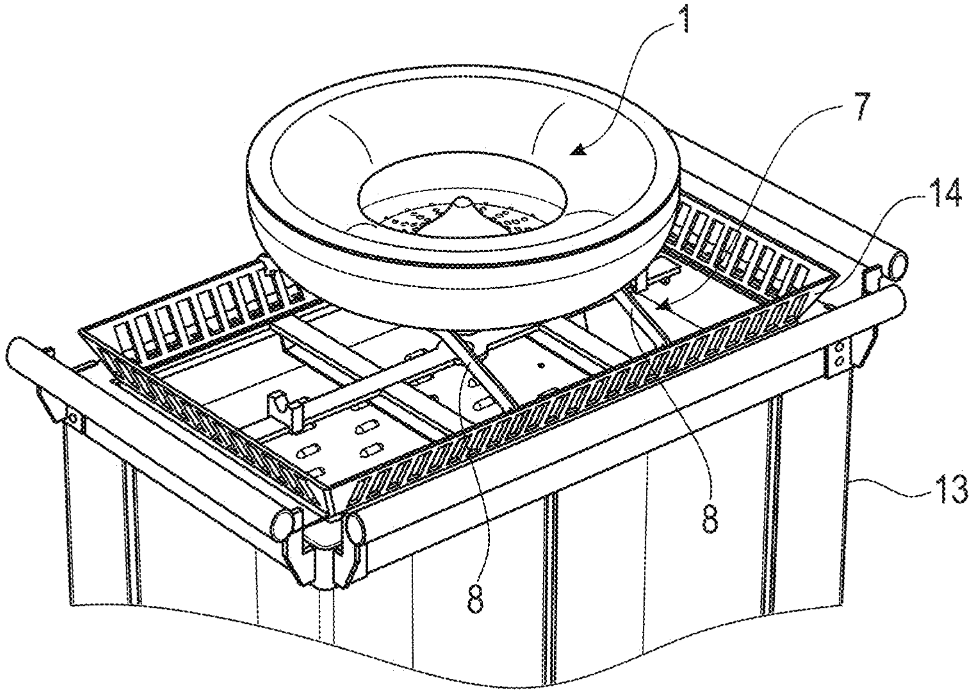
FIG. 5: shows a perspective view of the infusion bowl from FIG. 1 attached to a sauna heater from above.
Figure 6:
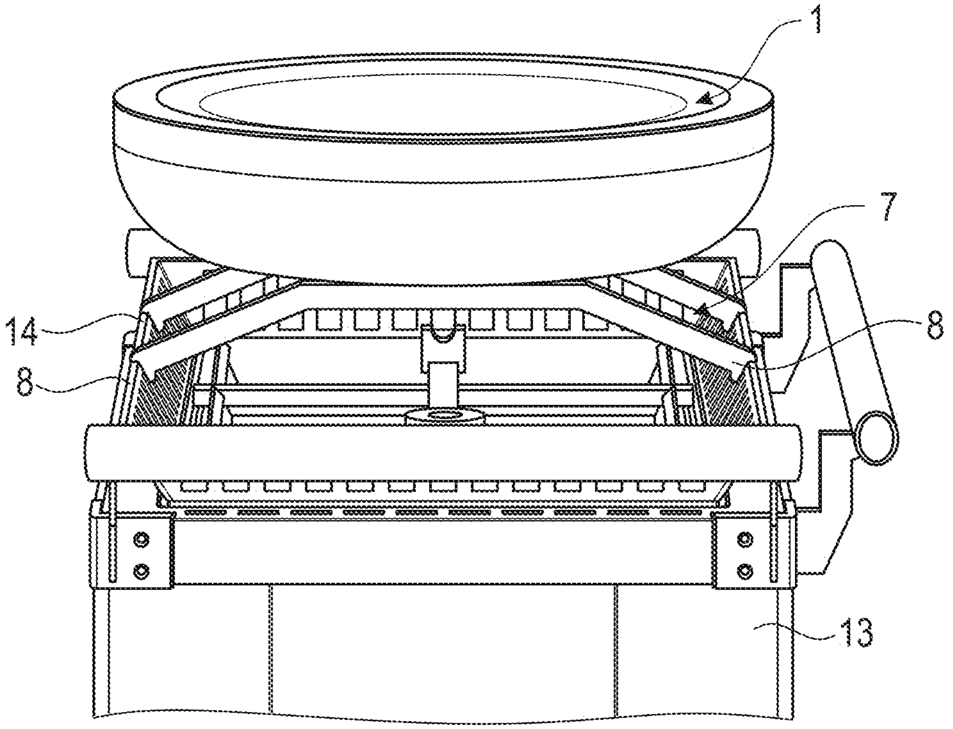
FIG. 6: shows a perspective view of the infusion bowl from FIG. 1 attached to a sauna heater from the side.

FIGS. 5 and 6 show infusion bowl 1 from FIG. 1 which is attached to a sauna heater 13. Sauna heater 13 comprises a stone fill 17 (see FIGS. 7 and 8) which is surrounded by a frame 14. Frame 14 can preferably be formed as a cast frame. Legs 8 of attachment device 7 of infusion bowl 1 are connected to frame 14, for example, hooked in or screwed with a locking screw.

Figure 7:
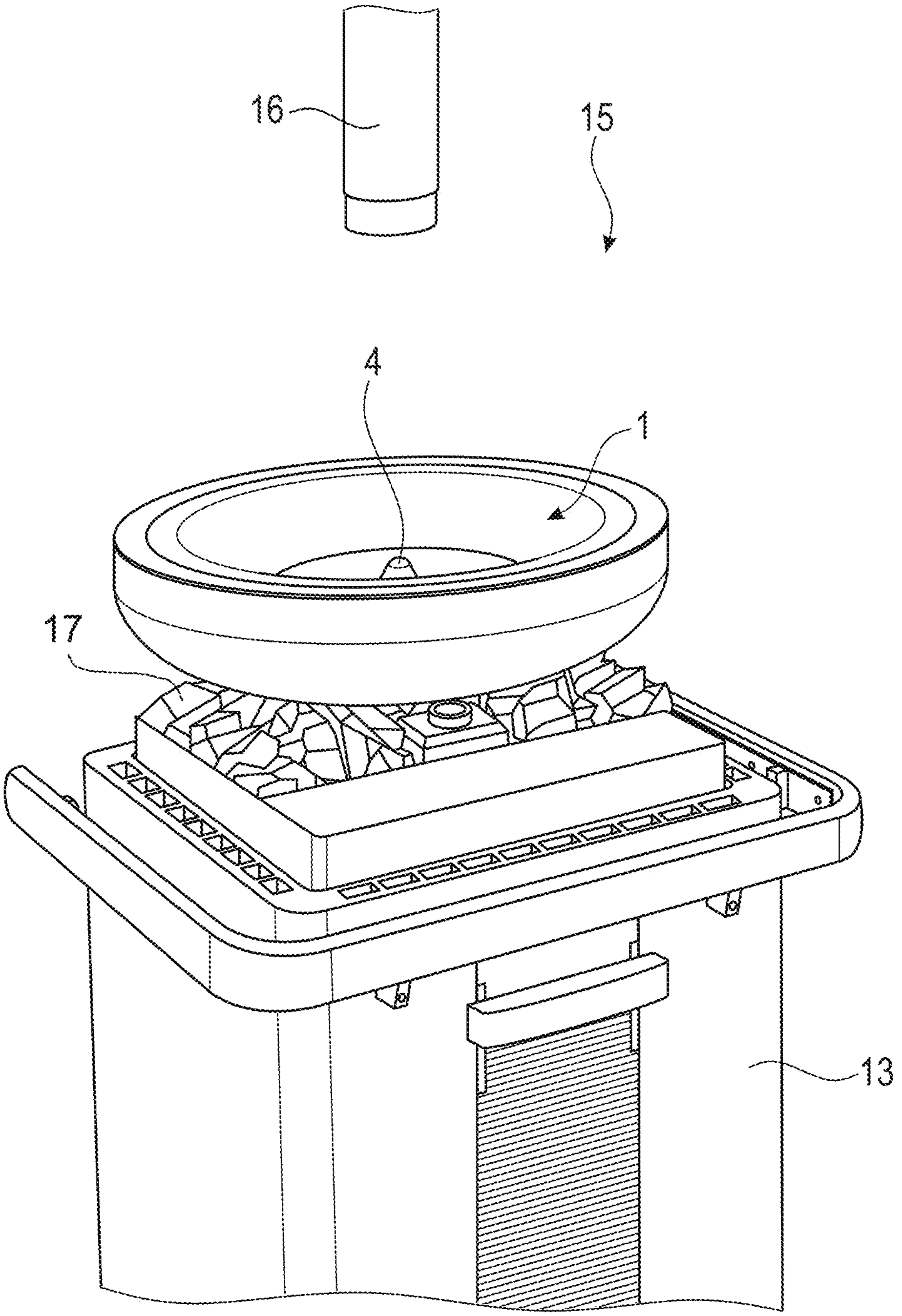
FIG. 7: shows a perspective view of an infusion device according to the disclosure for a sauna cabin with the infusion bowl from FIG. 1 and a feed pipe.

FIG. 7 shows a perspective view of an infusion device 15 according to the present disclosure. Infusion device 15 comprises infusion bowl 1 shown in FIG. 1 which is arranged on a sauna heater 13. Infusion device 15 furthermore comprises a feed device 16 with which the infusion liquid is dispensed into infusion bowl 1. Feed device 16 is configured as a pipe. The pipe is arranged centrally above infusion bowl 1. As a result, the pipe is arranged concentrically with conical projection 4 in bowl body 2 of infusion bowl 1. The infusion liquid dispensed into infusion bowl 1 by way of the pipe therefore impinges conical projection 4 at the center. Splash guard 3 ensures that the infusion liquid is not splashed into sauna cabin 1 when it is filled into infusion bowl 1. Conical projection 4 distributes the infusion liquid uniformly in the interior of infusion bowl 1. Infusion device 1 enables an automated infusion to be carried out in the sauna cabin. In this embodiment, stone fill 17 of sauna heater 13 is not surrounded by a frame. Attachment device 7 of infusion bowl 1 is attached to other components of sauna heater 13.

Figure 8:
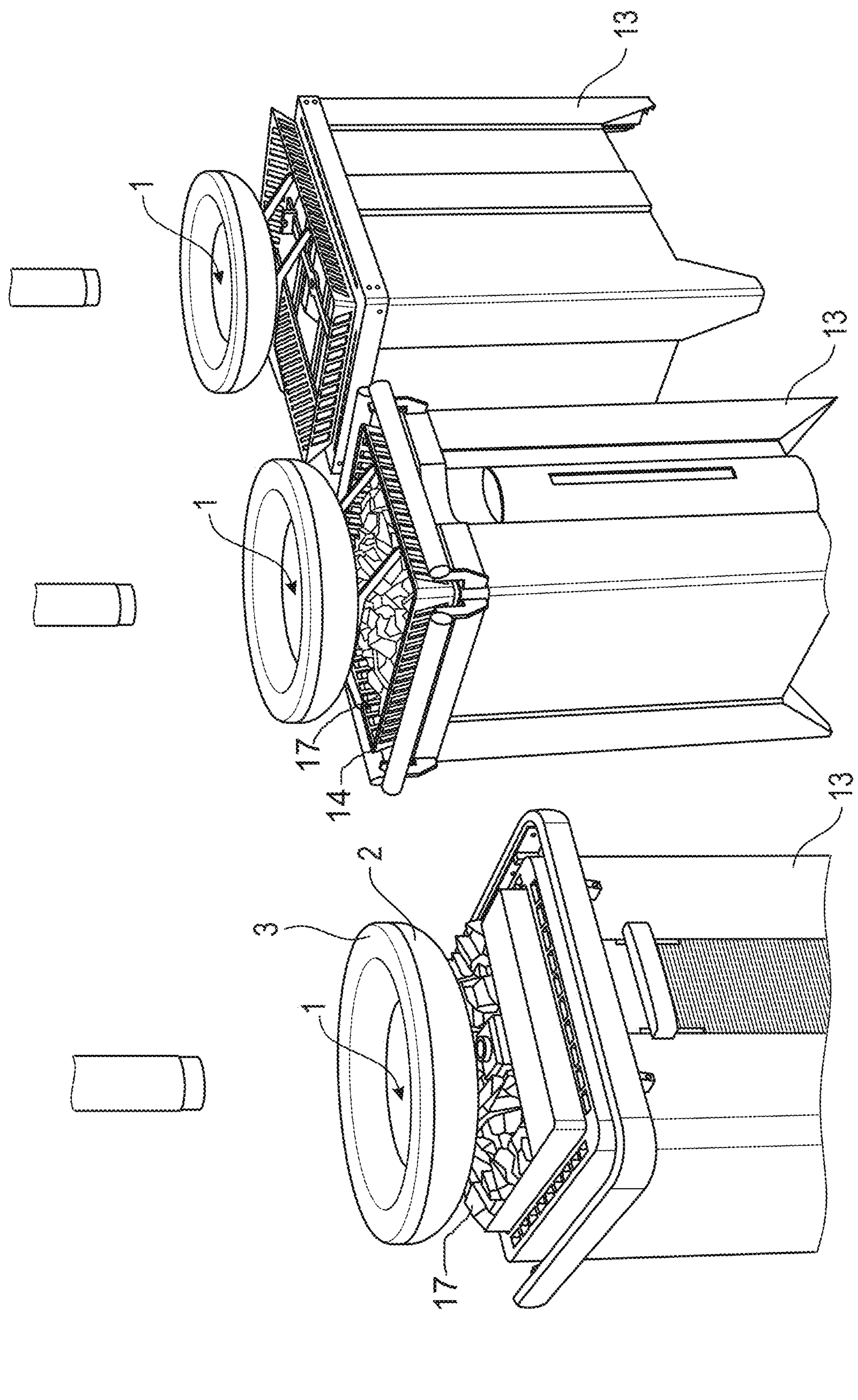
FIG. 8: shows a perspective view of a further embodiment of an infusion bowl that is attached to various sauna heaters.
Figure 9:
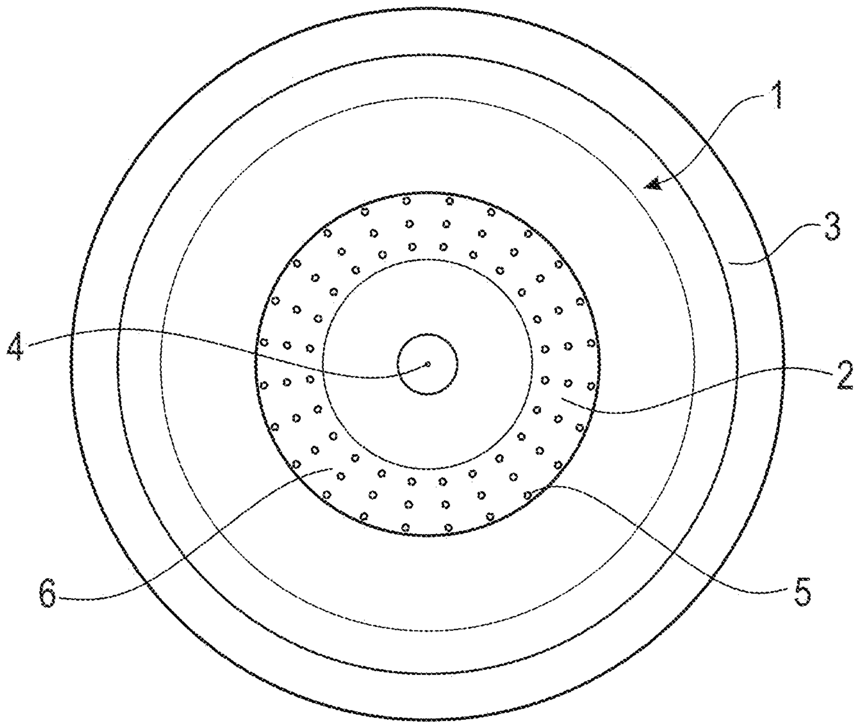
FIG. 9: shows a top view of a further embodiment of an Infusion bowl.
Figure 10:
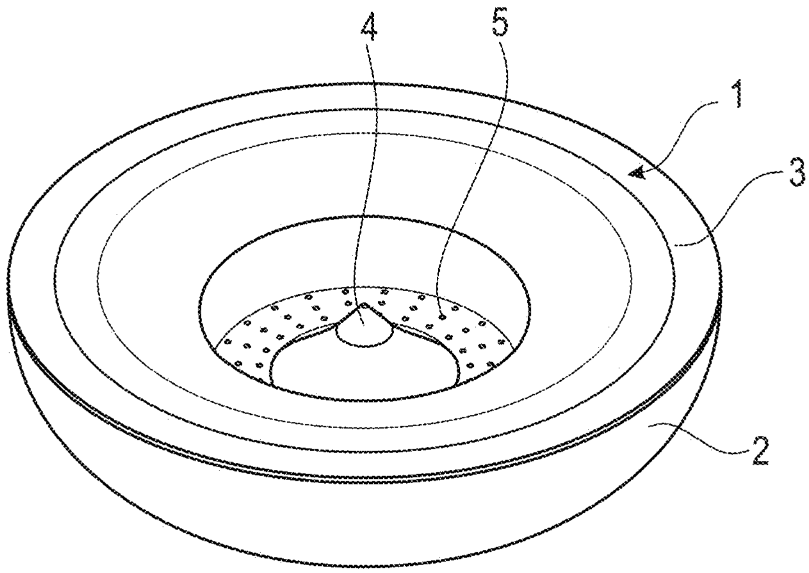
FIG. 10: shows a perspective embodiment of the infusion bowl from FIG. 10 from above.
Figure 11:
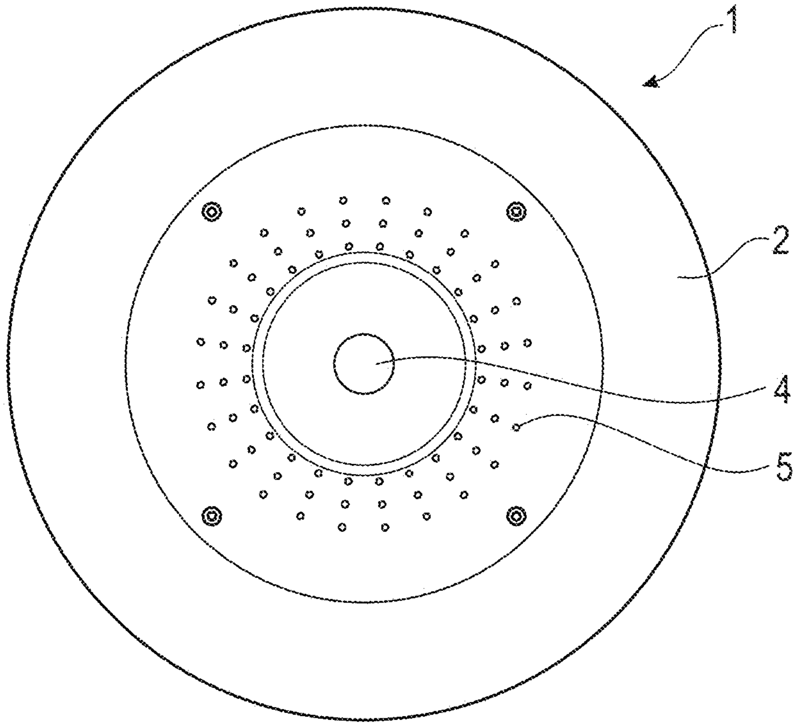
FIG. 11: shows a view of the infusion bowl from FIG. 10 from below.
Figure 12:
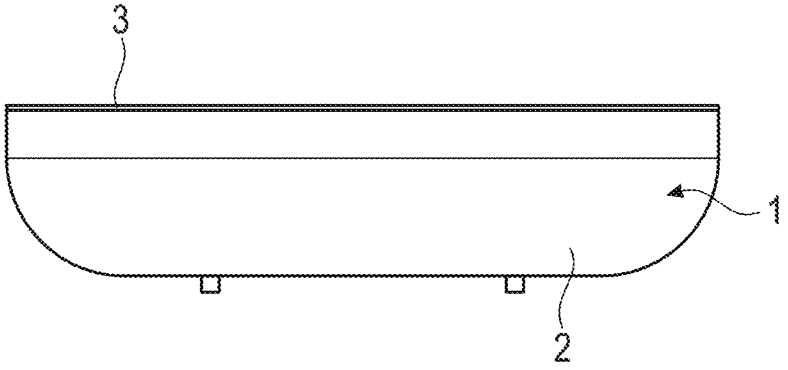
FIG. 12: shows a side view of the infusion bowl from FIG. 10.

FIG. 8 shows a different embodiment of infusion bowl 1 which is attached onto three different sauna heaters. Only the differences of infusion bowl 1 shall be discussed hereafter. For the components not mentioned, reference is made to the remainder of the description. Infusion bowl 1 according to FIG. 8 likewise comprises a bowl body 2 and a splash guard 3. The side wall of bowl body 2 is more curved than in the first embodiment. Splash guard 3 extends upwardly starting out from bowl body 2 and then curves inwardly from there into the interior of bowl body 2.

FIGS. 9 to 12 show yet another embodiment of infusion bowl 1. Here as well, substantially only the differences shall be described. For the components not mentioned, the above description is made reference to. Infusion bowl 1 likewise comprises a bowl body 2 that is open at the top and a splash guard 3 arranged on bowl body 2. Filling opening 6 is formed in splash guard 3. Conical projection 4 is formed in the base of bowl body 2. Conical projection 4 tapers towards the top. The tip can be formed as a separate component. Outlet openings 5 are formed in bowl body 2. Outlet openings 5 are arranged on circular lines that are concentric with conical projection 4. Three circular lines of outlet openings 5 are formed. Outlet openings 5 are circular. All outlet openings 5 have the same diameter. Outlet openings 5 are formed in the base of bowl body 2. No outlet openings are formed in the outer surface of conical projection 4.

Obviously, many modifications and variations of the present disclosure are possible in light of the above teachings and may be practiced otherwise than as specifically described while within the scope of the appended claims. Additionally, it is to be understood that all features of all claims and all embodiments can be combined with each other as long as they do not contradict each other.

LIST OF REFERENCE SIGNS

1 infusion bowl
2 bowl body
3 splash guard
4 conical projection
5 outlet opening
6 filling opening
7 attachment device
8 leg of the attachment device
9 base of the bowl body
10 side wall of the bowl body
11 outer surface of the conical projection
12 splash guard tab
13 sauna heater
14 frame, preferably cast frame,
15 infusion device
16 feed device/pipe

What is claimed is:

1. An infusion bowl for a sauna heater of a private sauna, the infusion bowl comprising:

a bowl body that is open at the top with outlet openings arranged in said bowl body, and wherein a splash guard with a filling opening is arranged on said bowl body.

2. The infusion bowl according to claim 1, wherein said splash guard is mounted on said bowl body.

3. The infusion bowl according to claim 2, wherein said splash guard comprises downwardly projecting tabs that interact with said bowl body.

4. The infusion bowl according to claim 1, wherein said splash guard on its outer circumference is flush with said bowl body.

5. The infusion bowl according to claim 1, wherein said splash guard is inclined inwardly in the direction towards said filling opening into the interior of said bowl.

6. The infusion bowl according to claim 1, wherein said bowl body comprises an upwardly tapered projection.

7. The infusion bowl according to claim 6, wherein said upwardly tapered projection of said bowl body and said filling opening of said splash guard are aligned concentrically with one another.

8. The infusion bowl according to claim 6, wherein said outlet openings in said bowl body are arranged concentrically around said upwardly tapered projection.

9. The infusion bowl according to claim 1, wherein said outlet openings have different diameters.

10. The infusion bowl according to claim 1, wherein the spacing between two adjacent outlet openings is larger than the diameter of said outlet openings.

11. The infusion bowl according to claim 1, further comprising an attachment device for the attachment of said infusion bowl to said sauna heater.

12. The infusion bowl according to claim 11, wherein said attachment device comprises at least three legs for the attachment to a frame of said sauna heater.

13. The infusion bowl according to claim 12, wherein the at least three legs of the attachment device includes four legs.

14. The infusion bowl according to claim 12, wherein the frame of the sauna heater is made of metal and is formed through a casting process.

15. A sauna heater for a private sauna, comprising:

an infusion bowl, said infusion bowl comprising;

a body bowl that is open at a top with outlet openings arranged in said bowl body, and a splash guard with a filling opening arranged on said bowl body.

16. The sauna heater according to claim 15, further comprising a stone fill surrounded by a frame, wherein said infusion bowl is attached to said frame.

17. The sauna heater according to claim 16, wherein the frame is a cast frame.

18. An infusion device for a private sauna cabin, comprising:

a sauna heater according to claim 15, and a feed device arranged above said infusion bowl and configured to feed infusion liquid into said infusion bowl.

* * * * *